April 26, 1960　　　P. R. BRADLEY, JR　　　2,934,414
EXTRACTION OF SULPHUR

Filed Dec. 21, 1956　　　3 Sheets-Sheet 1

INVENTOR.
PHILIP R. BRADLEY, JR.
BY
Townsend and Townsend
ATTORNEYS

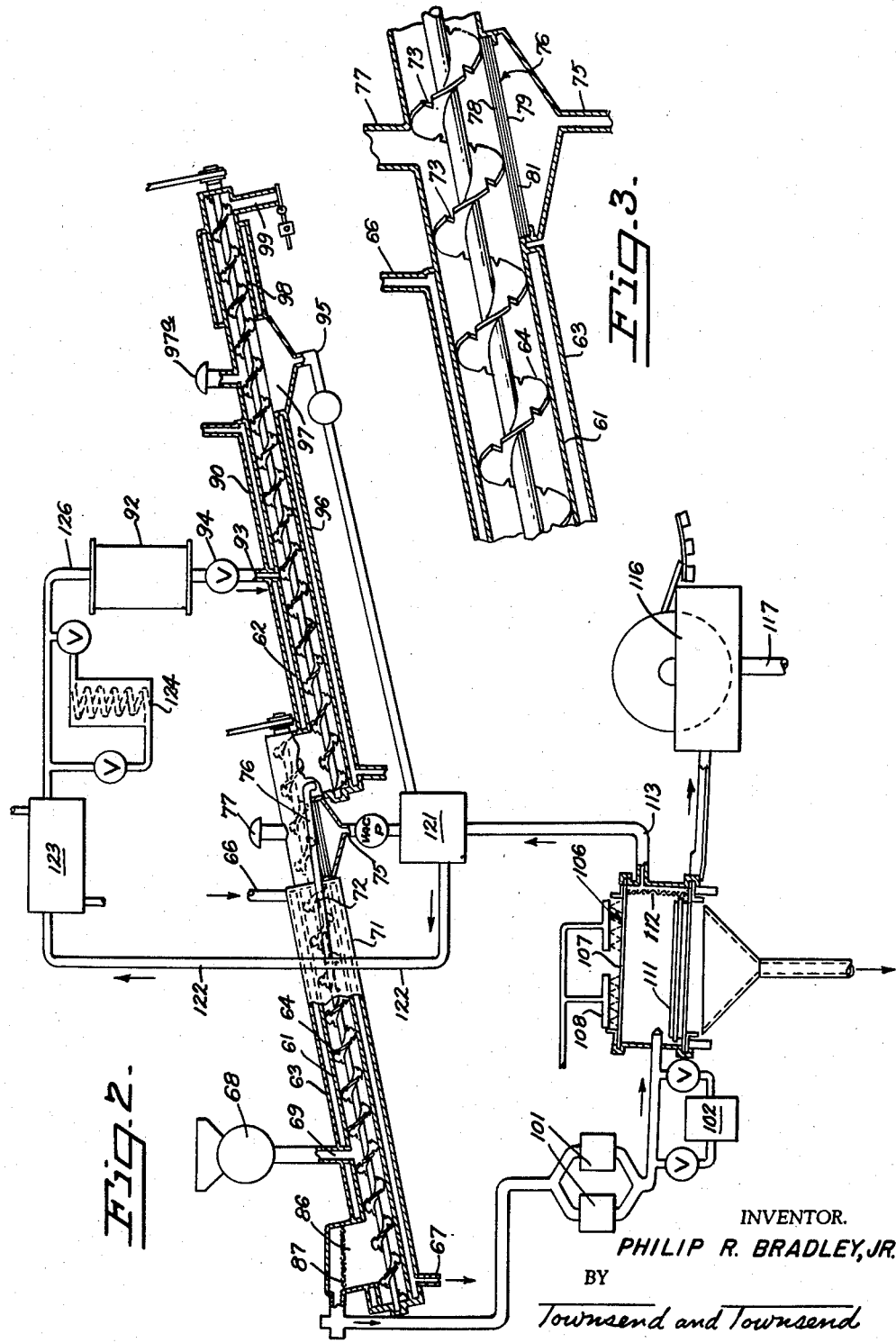

April 26, 1960   P. R. BRADLEY, JR   2,934,414
EXTRACTION OF SULPHUR
Filed Dec. 21, 1956
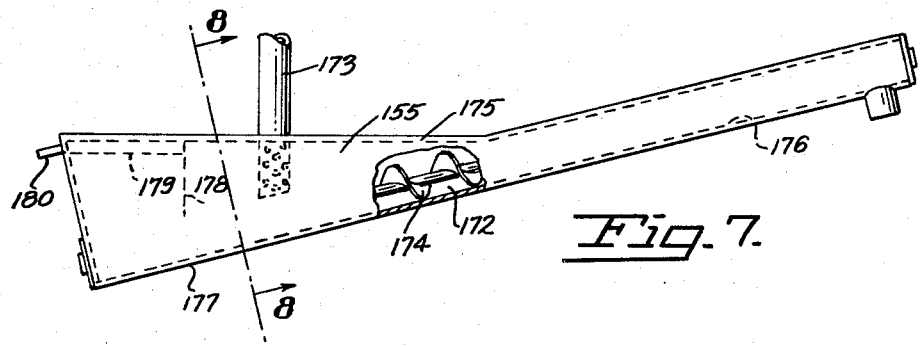
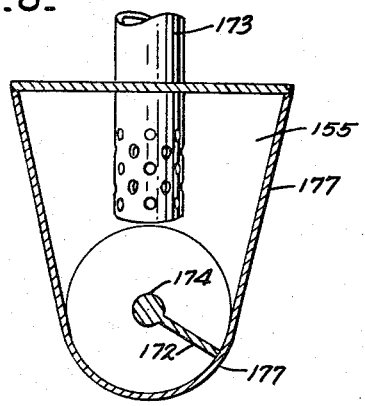
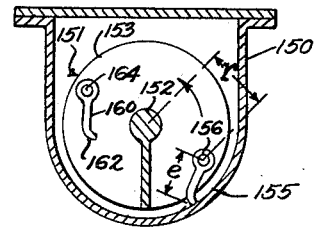
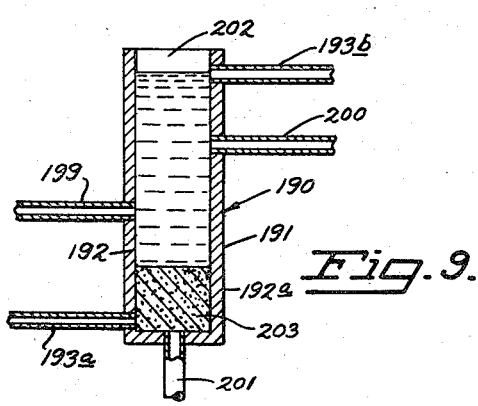
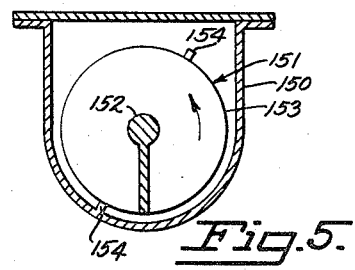
INVENTOR.
PHILIP R. BRADLEY, JR.
BY
Townsend and Townsend
ATTORNEYS

United States Patent Office 2,934,414
Patented Apr. 26, 1960

2,934,414

EXTRACTION OF SULPHUR

Philip R. Bradley, Jr., Berkeley, Calif., assignor to Alaska Juneau Gold Mining Company, Los Angeles, Calif., a corporation of West Virginia Application December 21, 1956, Serial No. 629,816

6 Claims. (Cl. 23—312)

This invention relates to the extraction of sulphur from ores, residues and other solid mixtures containing elemental sulphur.

This application is a continuation-in-part of my copending application Serial No. 222,659 (now abandoned), entitled "Apparatus and Method for the Extraction of Sulphur," filed April 24, 1951.

One method for producing free or elemental sulphur is the so-called Frasch method wherein hot water or steam is injected into an underground deposit of sulphur to melt the same, and molten sulphur is forced to the surface by means of compressed air. Sources of sulphur amenable to this process, to produce sulphur of high purity without further refinement, are diminishing.

There are available extensive sources of free sulphur from which sulphur cannot be recovered as feasibly by the Frasch process as are underground sulphur deposits which are presently being worked by the Frasch process. Thus, in the Western states there are large deposits of ore containing 15 to 50% of elemental sulphur together with a gangue which is generally siliceous and which may contain a small amount of gypsum. Also there are available the so-called "bin bottoms" from the Frasch process, which contain approximately 50% sulphur. There are also available residues from the concentration of sulphur ores by flotation to produce a sulphur concentrate which is then heated to melt the sulphur. The molten sulphur is separated by filtration, leaving a residue which cannot be further concentrated by flotation.

It is an object of the present invention to provide a means of producing relatively pure sulphur from ores containing the same, and/or from concentrates or residues resulting from present processes of producing sulphur such as the Frasch process and flotation processes.

Another object of the invention is to provide a method which is capable of extracting sulphur of high purity from ores or other solid mixtures containing sulphur, which is capable of a greater percentage of recovery of sulphur than heretofore.

Yet another object of the present invention is to provide apparatus which is capable of carrying out the method of the present invention in an efficient, rapid and economical manner.

Solvent extraction is available for producing sulphur from its ores, and from sulphur residues and concentrates produced by other processes. However, solvent extraction of sulphur presents certain difficulties. Perhaps the most common sulphur solvent is carbon disulphide. This solvent, however, is disadvantageous because of its low boiling point, its flammability and its toxicity. Desirably a sulphur solvent for continuous commercial extraction of sulphur is an inexpensive liquid which is non-toxic, and which dissolves a relatively large amount of sulphur at about 230° F. (the approximate melting point of sulphur), and precipitates most of its sulphur content when cooled to about 60° F. Preferably the solvent should have neither too low nor too high a boiling point. A low boiling solvent may result in high solvent losses through evaporation and a high boiling solvent may result in high solvent losses due to carryover of solvent with the extracted residue.

In addition to considerations affecting the selection of a suitable solvent, the process of extraction should be designed to obtain a high recovery of sulphur and of solvent and to yield a sulphur product of high quality.

It is, therefore, an object of the present invention to provide a solvent process for the production of sulphur which is more practical and economical than solvent processes known heretofore.

Yet another object of the invention is to provide an economical, efficient solvent extraction process which is applicable to the recovery of sulphur from sulphur ores (with or without pre-concentration of the ore) and from residues which are the by-products of producing sulphur by other processes.

A still further object of the invention is to provide method and apparatus whereby sulphur can be extracted from ores, concentrates, residues and the like by solvent extraction, such method and apparatus making use of economical solvents, providing a high percentage recovery of sulphur, and providing an efficient recovery of solvent for re-use in the process.

These and other objects of the invention will be apparent from the ensuing description and the appended claims.

Certain forms of the invention are illustrated by way of example in the accompanying drawings wherein, Fig. 1 is a diagrammatic flow sheet of the process of the invention;

Fig. 2 is a vertical section through the preferred apparatus of the invention;

Fig. 3 is an enlarged sectional view of a portion of the apparatus of Fig. 2;

Fig. 5 is a transverse sectional view taken along the line 5—5 of Fig. 4;

Fig. 6 is a view similar to that of Fig. 5 but showing yet another modification in which scraper blocks are employed instead of scraper rods;

Fig. 7 is a longitudinal, sectional view of still another form of lower digester tube;

Fig. 8 is a transverse sectional view taken along the line 8—8 of Fig. 7; and

Fig. 9 is a vertical section through an apparatus for separating extracted sulphur from solvent by liquation.

Figures 1, 4:
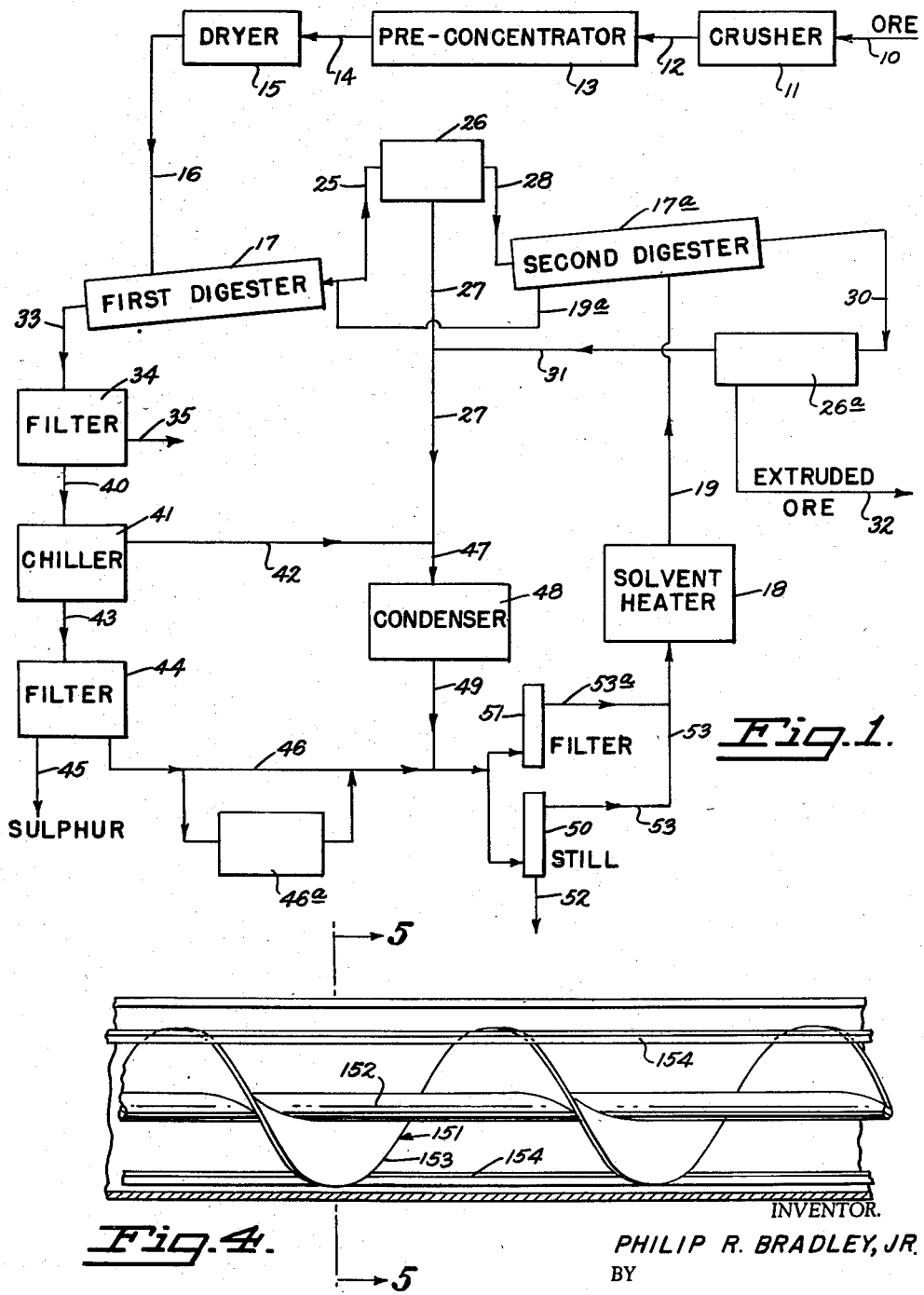
Fig. 4 is a fragmentary, longitudinal, sectional view of a modified form of lower diameter tube incorporating scraper rods.

In accordance with the present invention an ore, a concentrate, a residue or other solid mixture containing elemental sulphur is treated with a heated solvent to extract sulphur in the form of a solution, and the resulting solution is then cooled to precipitate the dissolved sulphur. In the preferred embodiment of my invention, I employ a selected solvent having characteristics which are described in detail hereinafter, and I also employ certain steps or procedure in the extraction process and in the solvent process to extract the maximum amount of sulphur and to efficiently recover the used solvent.

Many different sulphur solvents are available. Among hydrocarbons, aromatic liquids are better solvents for sulphur than non-aromatic liquids, but not every aromatic solvent is practical. The solvent should embody the proportions of relatively high solvent power for sulphur at a moderately elevated temperature, e.g., 100 parts by weight of solvent should dissolve at least about 25 to 30 parts by weight of sulphur at 230° F., which is approximately the melting point of sulphur. The preferred solvent should also precipitate the greater part of its sulphur when cooled to about 60° F. The solvent is preferably one which boils at about 230° to 450° F., most advantageously about 280 to 410° F. It may be a pure compound or a mixture having an initial boiling point and an end point within the range indicated. Higher boiling solvents render solvent recovery more expensive and entail a greater solvent loss through carryover with the extracted solids, and they are usually more difficult than lower boiling solvents to remove from the sulphur produced. Lower boiling solvents require maintenance of pressure to achieve without undue loss of solvent a sufficiently high temperature to dissolve a large quantity of sulphur per unit of solvent, and they usually entail a greater solvent loss through evaporation.

In selecting an appropriate solvent, another feature of importance is its cost. Solvents used should not be unduly expensive, both from the standpoint of original capital outlay and particularly from the standpoint of loss of solvent during use. Furthermore, the solvent vapors should be non-toxic and should not present a health hazard to the workmen. The solvent should not be highly inflammable and should be stable. It should not deteriorate with repeated use.

The preferred solvents are extremely low aniline point hydrocarbon mixtures which may be derived from coal tar distillation or suitable fractions of petroleum and which boil within the range of about 280° to 500° F., preferably 280° to 410° F. and consisting almost entirely of aromatic hydrocarbons. A specific example of a good solvent for the purpose is a petroleum fraction sold by the Standard Oil Company of California under the trademark "Socal No. 3." "Socal No. 3" has a distillation range as follows:

|  | ° F. |
|---|---|
| Initial | 357 |
| 5% | 363 |
| 10% | 364 |
| 20% | 365 |
| 50% | 371 |
| 90% | 384 |
| 95% | 390 |
| Dry or end point | 406 |

Its mixed aniline point, A.S.T.M. D611–46T, is 61.5° F. The specific gravity of the solvent is 0.888 and its A.P.I. gravity is 27.8. By way of explanation, the aniline point is the temperature at which, under conditions specified in A.S.T.M. D611–46T test, aniline will separate from a solution of aniline in an equal volume of the liquid tested. The lower the aniline point of a hydrocarbon mixture, the greater the proportion of the aromatics therein. Hydrocarbon mixtures of extremely high aromaticity, which are preferred for purposes of the present invention, are so freely miscible with aniline that, under the conditions of A.S.T.M. D611–46T test, the aniline separates by freezing. To avoid this, in the mixed aniline test (same A.S.T.M. designation), a mixture of two volumes of aniline, one volume of the hydrocarbon mixture tested and one volume of n-heptane, is employed. Thus, a mixed aniline point of 61.5° F. indicates a much lower aniline point, hence a much higher aromaticity than, say, a conventional aniline point of −20° F. or −30° F.

Another preferred solvent is "Socal No. 2," which is also a trademark of the Standard Oil Company of California. "Socal No. 2" has a mixed aniline point of 64° F., a specific gravity of 0.8586, an API gravity of 33.3 and a distillation range as follows:

|  | ° F. |
|---|---|
| Initial | 280 |
| 5% | 284 |
| 10% | 286 |
| 50% | 292 |
| 90% | 310 |
| 95% | 321 |
| End point | 332 |

It has an advantage compared to "Socal No. 3" in that it has a lesser tendency to become discolored in use as a sulphur extracant.

Other suitable solvents are Shell TS–16 Solvent, Shell TS–28 Solvent, and Shell Aromatic Solvent 42. These are petroleum solvents manufactured by Shell Oil Company having the following typical data:

|  | TS–16 | TS–28 | Aromatic Solvent 42 |
|---|---|---|---|
| API Gravity at 60° F | 35.6 | 33.6 | 27.2 |
| Aromatics, percent by volume, ASTM | 74 | 65 | 65 |
| Aniline point |  | 22 | 23 |
| Mixed aniline point | 66 | 91 | 96 |
| Distillation range: |  |  |  |
| IBP | 287 | 320 | 385 |
| 10% | 295 | 334 | 400 |
| 50% | 309 | 349 | 423 |
| 90% | 340 | 375 | 463 |
| FBP | 365 | 402 | 500 |

Still another suitable solvent is one sold by Union Oil Company under the designation "4060–0" having an API gravity of 23, a mixed aniline point of 28.7, percent aromatics of 78% and the following distillation range:

| Initial | ° F. | 400 |
|---|---|---|
| 10% | ° F. | 428 |
| 50% | ° F. | 450 |
| 90% | ° F. | 485 |
| 95% | ° F. | 497 |
| Maximum | ° F. | 540 |
| Recovery | percent | 98½ |

The most advantageous solvents, exemplified by the aforesaid Socal No. 3, Socal No. 2 and Shell TS–16 Solvent, are narrow cuts of petroleum having mixed aniline points below about 70° F.; having an initial boiling point not less than about 280° F. and an end point not greater than about 410° F.; and consisting of about 70 to 90% or more of what I prefer to call the "intermediate benzene homologues." Reference to tables will show that the trimethyl benzenes (the 1:2:3; 1:2:4 and 1:3:5 isomers) boil at or near the lower end of this boiling range; likewise other benzene homologues having the empirical formula $C_9H_{12}$, such as cumene and o, m and p-methyl ethyl benzenes. These and other somewhat higher homologues boiling within the range indicated, constitute the preferred solvents of the invention, whether used singly, in the form of artificial mixtures or in the form of narrow cuts from solvent extracts or other refined products derived from petroleum or coal tar distillates. A highly refined petroleum solvent such as Shell Xylene 92 may also be employed. This particular solvent has an API gravity at 60° F. of 32.7; it consists of 86% aromatics; and it has an initial boiling point of 289.4° F. and a dry point of 296.6° F.

In addition to the hydrocarbon solvents mentioned above, chlorinated aromatics may also be employed and will serve to exemplify non-hydrocarbon solvents. Thus mono-chlorbenzene, the o-, m- and p-dichlorbenzenes and mixtures thereof may be used. o-Dichlorbenzene, for example, dissolves much more sulphur than "Socal No. 3." Blends of these chlorbenzenes with hydrocarbon solvents, such as "Socal No. 2" and "Socal No. 3," may be used.

It is an additional desirable property of solvents employed in accordance with the present invention that they exhibit a low solvent power for certain deleterious substances which are commonly associated with sulphur, namely, arsenic, selenium and tellurium. The preferred solvents hereinabove mentioned, including both the hydrocarbon and non-hydrocarbon varieties, meet this desideratum.

The source of sulphur may be a sulphur ore as mined, or an ore which has been concentrated, as by means of flotation by any of several well-known methods. When the sulphur content of the ore is less than 20%, it is preferably concentrated. Preferably a lean ore is concentrated to a sulphur content of about 50 to 60%. I have found that working with leaner ores is less desirable because of the larger quantity of solvent required, the larger equipment necessary to handle a greater volume of ore, greater heat consumption and greater loss of solvent due to carryover with the extracted ore.

Prior to solvent extraction of ore or other solid mixture containing elemental sulphur, it is preferably dried. I have found that the presence of moisture in ore during solvent extraction gives rise to difficulties. Thus steam is given off, which has a tendency to carry particles of ore over with the enriched solvent and which forms sulphurous acid with sulphur dioxide. The latter is corrosive, and may require the addition of a neutralizer, such as lime rock, to the ore. In drying the ore, it is preferably maintained at a temperature less than the melting point of sulphur, i.e., less than about 230° F. The production of molten sulphur during the preliminary drying operation is troublesome in the practice of the present invention, because it has a tendency to accumulate in local areas, then solidify and impede moving parts of the dryer. Also molten sulphur tends to agglomerate, forming large particles which present less surface to the extraction solvent.

The extracting solvent and dried ore or other solid mixture containing elemental sulphur, are then intimately contacted. Various types of equipment and various procedures may be employed. However, I prefer to employ countercurrent contact of solvent and ore, as by causing a body of finely divided ore to move upwardly along an incline by means of a spiral conveyor, meanwhile causing heated solvent to pass downwardly through such conveyor. I also prefer that the initial contact between the ore and solvent occur when the two are at approximately the same temperature. Thus the ore is preferably preheated, before it is introduced into the hot solvent, to approximately the same temperature as the solvent. Otherwise, if cold ore contacts enriched solvent, it will cool the solvent and reduce its solvent power.

The temperature of the solvent may vary. The higher the temperature of the solvent, the more sulphur will be extracted. Preferably, however, the solvent is maintained substantially below its boiling point so that it is not necessary to pressurize the apparatus and otherwise prevent evaporation and loss of solvent. However, a solvent heated to or above its normal boiling point may be employed, provided suitable means are employed to prevent escape of solvent, or provided means are employed to control and to recover the vapors of solvent. Preferably the extraction is carried out at about the melting point of the sulphur, e.g., at about 230° to 240° F., and a solvent is employed whose boiling point (if a pure compound) or initial boiling point (if a mixture) is substantially greater than 230° F.

The countercurrent contact between the ore or other solid mixture and the solvent is carried out with gentle agitation and in a manner to avoid stagnant areas where the solids and solvent remain out of intimate contact with one another. This is most readily accomplished by the use of a spiral conveyor, as described more fully hereinafter with reference to the drawings.

At one or more points between the point of ore input and the point of solvent input, I preferably employ one or more "beach areas," where ore is not submerged in solvent and is drained free of liquid, preferably with the aid of suction. A more efficient extraction is thereby achieved. In general, assuming that 10% of the solvent adheres to the solids each time the solids are drained, then the ultimate loss of sulphur will be $1/10$ if the solids are drained once, $1/10^2$ if the solids are drained twice and $1/10^n$ if the solids are drained $n$ times.

Referring now to Fig. 1 of the drawings, which is a flow sheet, an ore or other solid containing elemental sulphur is introduced at 10 into a crusher 11 where it is crushed to a suitable fineness. It may then be introduced at 12 into preconcentrating apparatus indicated at 13. If the ore or other solid material already contains a sufficiently high proportion of sulphur, this preconcentration step may be eliminated. Such pre-concentration, if carried out, may be accomplished by any suitable means, preferably by a flotation method. Selective flotation methods for concentrating sulphur ores are well-known and require no detailed description herein. In this connection, it is desired to point out that the fineness of the crushed ore is largely governed by the presence or absence of a pre-concentration step. If the ore is subjected to solvent extraction without pre-concentration, a fineness of ¼ inch is usually sufficient. If a pre-concentration by flotation is carried out, the ore is preferably ground to a fineness such that substantially all will pass a No. 48 mesh screen.

The ore is next introduced at 14 into a dryer 15 wherein it is subjected to an elevated temperature, preferably less than the melting point of sulphur, i.e., less than about 230° F. for a time sufficient to expel substantially all free water from the ore. The dried ore is then introduced at 16 into a first extraction vessel or digester 17. As indicated above, the dried ore is preferably introduced into the extraction vessel while it is still in heated condition. Solvent which has been heated in a suitable vessel, indicated at 18, is introduced at 19 into a second extraction vessel 17a (which is described hereinafter) and, after passing therethrough, it is introduced at 19a into the first extraction vessel 17. The extraction vessel 17 may be of any type. Preferably, however, it is an inclined spiral conveyor, suitably housed and jacketed with a heating jacket, as is explained more fully hereinafter in connection with Figs. 2 and 3. Countercurrent contact of the dry, heated ore and heated solvent are carried out in the vessel 17, the sulphur being partly molten or near its melting point. The extraction process is illustrated in Fig. 1 as being carried out in two stages. Thus, partially extracted ore is removed at 25 from the first extraction vessel 17 and is introduced into a drainage vessel or beach area 26 to drain off liquid from the partially extracted ore. Preferably suction is applied to remove liquid which does not drain. Liquid which has drained is preferably returned to the first extraction vessel 17 and liquid and vapor which are removed by suction are taken off at 27 and are collected and returned to the system as described hereinafter. The partially extracted and drained ore is then introduced at 28 into the second extraction vessel 17a. Meanwhile fresh solvent is continuously introduced at 19 into the second extraction vessel 17a.

Fully extracted ore is withdrawn from the vessel 17a at 30 and is introduced into a second drainage vessel or beach area 26a which may be the same as or similar to the drainage vessel 26. That is, liquid is drained from the extracted ore and is returned to the second extraction vessel 17a and residual liquid adhering to the ore is sucked off and is taken off at 31 for restoration to the system. The extracted ore is then removed at 32. Enriched solvent is taken off at 33 for further processing, as described hereinafter.

For ease of illustration, the extraction procedure of my invention is shown in Fig. 1 as being carried out in two stages and in two separate vessels (the vessels 17 and 17a), with the drainage steps also being carried out in separate vessels (the vessels 26 and 26a). It will be understood that continuous counter-current extraction of ore and drainage of ore can be carried out in this manner in a single vessel or piece of apparatus, as illustrated in Fig. 2 and as described in detail hereinafter. It will also be understood that the extraction may be carried out in a greater number of steps than the two illustrated in Fig. 1, and that the solids may be drained and sucked dyy at more than two stages of the operation.

The enriched solvent, sometimes referred to as pregnant solvent, containing by now a high proportion of sulphur and still in heated condition, is removed from the first extraction vessel 17 at 33 and is then preferably passed through a filter 34 to remove suspended particles of solids. The separated solids may be removed continuously or from time to time at 35. The filtered solvent, still in heated condition, is removed from the filter at 40 and is introduced into a chiller 41 wherein the solvent is chilled by any suitable means, as by means of air or water or by means of chilling coils. The temperature of the enriched solvent is reduced to a point where it will precipitate the greater part of its sulphur. Preferably, the solvent is cooled to about 60° F. Some vapor necessarily exists in the chiller 41 and is removed at 42 for processing and restoration to the system. Chilled solvent and precipitated sulphur, which are now in the form of a slurry, are removed at 43 and are introduced into a filtering device 44 for separating the solid sulphur from the mother liquor or used solvent. Preferably the deposit of sulphur on the filter drum or other filtering medium is washed with a suitable solvent, such as methylene chloride or trichlorethylene. Alternatively, solvent may be removed from the deposit of sulphur by evaporation. For example, the sulphur may be given a wash with heated air, the temperature of which is sufficient to evaporate the solvent but insufficient to melt the sulphur. A vacuum may be employed to facilitate removal of the solvent, and it may be advantageous to use vitiated or inert air, or gases such as air mixed with diesel engine exhaust or diesel engine exhaust itself. The use of such a gas minimizes oxidation. Solid sulphur is removed from the system at 45 and the recovered solvent or mother liquor is removed from the filter 44 at 46.

It is important in the process of my invention that a maximum recovery of solvent be effected, inasmuch as the solvent constitutes one of the large items of expense in operating the system. Accordingly, solvent vapor and liquid solvent gathered from various parts of the system are introduced, through a common line 47, into a condenser 48, wherein the vapors are cooled or absorbed by any suitable means to a sufficient degree to condense them to liquid.

The liquid is then sent through a line 49, to which the line 46 from the filter 44 is connected, either to a still which is shown at 50, or to a decolorizing filter which is shown at 51. If desired, both a still and filter may be employed. If a still is employed, the distillation residue is taken off at 52 and it may go to waste or it may be further processed. A distillate is taken off at 53 and is introduced into the solvent heater 18. If a decolorizing filter is employed, the mother liquor is passed through a suitable filtering medium to remove solid suspended particles and colored impurities which might discolor the sulphur product of the process. The filtered solvent or mother liquor is introduced through a line 53a into the line 53, thence to the solvent heater 18. It will be understood that it may be sufficient to pass a part only of the recovered solvent through the still 50 or decolorizing filter 51, and that the remaining part of the recovered solvent may be passed directly to the heater 18.

In carrying out the process it is preferable not to maintain the dissolved sulphur in solution at the maximum extraction temperature for a lengthy period of time; otherwise the sulphur, when precipitated, may have an undesirable brown color.

Referring now to Figs. 2 and 3 of the drawings, a preferred type of apparatus is there illustrated for carrying out the solvent extracting process of the present invention.

The digesting of the sulphur of the ore is carried out in two or more digesting tubes 61 and 62. As illustrated in Fig. 1, the first digesting tube 61 is enclosed by a casing 63 and is inclined at an angle of about 10° with respect to the horizontal. The tube 61 is supplied with a spiral conveyor 64 which is rotated by an electric motor or other suitable power source. The tube 61 is heated by means of steam introduced into the annular space between tube 61 and the casing 63 through a steam inlet 66 and a discharge 67, or by other means so as to maintain the ore and solvent at an elevated temperature which will promote dissolving of the sulphur in the solvent. Crushed ore is heated to about 230° F., which is the preferred working temperature of the system, to drive off moisture from the ore so that, when introduced into the system, the ore is free of moisture or as nearly so as practicable. A feed device 68 is employed to supply the dry, heated, crushed ore continuously and at a predetermined rate, and this ore is introduced through a port 69 at about the middle of digester tube 61 and is moved upwardly by conveyor 64. As the ore moves upwardly, it is brought into intimate mixing contact with sulphur-bearing solvent which is produced in the second digester tube 62, as hereinafter described. The amount of solvent furnished depends on the richness of the ore. The solvent tends to flow downwardly toward the bottom of the tube 61, and the ore from which the sulphur has been at least partially removed, is carried upwardly by conveyor 64. Digester tube 61 is not maintained full of solvent, but a beach area or drying area 71 is maintained adjacent the upper end of the tube. The purpose of said beach area is to drain the ore by removing it from contact with solvent, and, accordingly, the solvent is introduced into the digester tube through a pipe 72 opening below said beach area. Apertures 73 in the helical blades of conveyor 64 are formed so as to facilitate draining of the solvent, and to reduce the quantity of entrained solvent. Preferably said apertures are formed in the shape of sector-like notches 73.

The ore is carried up beyond the beach area by conveyor 64 and into a filter area 76 of digester tube 61. The bottom wall of said tube 61 is cut away and is replaced by a filter, and a vacuum is drawn through said filter area which removes solvent from the ore through a duct 75. An air vent 77 is provided and is regulated to admit air at the rate it is drawn off by the vacuum system, in order to preserve the liquid level in tube 61 and to prevent the vacuum from pulling liquid upwardly in tube 61. The construction of filter 76, which is shown more clearly in Fig. 3, may comprise inner and outer porous screens 78 and 79, respectively, between which is disposed a porous fabric, such as canvas, at 81. After passing beyond filter area 76, the ore is relatively free of solvent and is then deposited in second digester tube 62, as hereinafter described.

Solvent in which sulphur is dissolved has, as has been stated, flowed downwardly through the first digester tube 61 and at the bottom end is brought into a settler 86 which is of considerably greater cross sectional area than tube 61 and is elevated so that the maximum elevation of the solvent is only slightly less than the solvent level in the first digester tube. The elevation and the increased cross-sectional area of settler 86 result in particles of ore settling out of the solution and falling down into the flights of conveyor 64 and being carried upwardly through first digester tube 61 and out through the upper end thereof. The solution is passed through a fine screen 87 and is thus ready for filtering and precipitation, as described hereinafter in this specification.

The ore discharged from first digester tube 61 falls into a spiral conveyor 90 at the lower end of second digester tube 62. Said second digester tube 62 is of a construction generally similar to first digester tube 61. Barren solvent is heated in a preheater 92 and introduced approximately at the middle of second digester tube 62 through port 93, the rate of flow thereof being controlled by a metering valve 94 in the line leading from solvent preheating tank 92. The solvent is introduced at a temperature of about 230° F. Ore, which has already been reduced in sulphur content by passage through the first digester tube 61, is brought into contact with fresh solvent and intimately mixed, which dissolves practically all of the sulphur still remaining in the ore. Sulphur bearing solvent flows downwardly to the bottom of tube 62 and is bypassed by a pipe 72 to the point of junction of the beach area 71 and the solvent in tube 61. Reintroduction of bypassed solvent at this point minimizes carry-over of sulphur with the ore from the first digester tube 61 to the second digester tube 62. The reason for this is as follows: Partially extracted ore at the junction of the beach area and solvent occludes solvent which is relatively rich in sulphur. If such ore with adhering sulphur-rich solvent is allowed to pass to the tube 62, a considerable carry-over of sulphur will result. By introducing the lean solvent from tube 62 at this junction, the adhering solvent is greatly diluted with respect to sulphur. Accordingly, the carry-over of sulphur is greatly reduced. By the provision of a filter such as shown at 97 and of a vacuum pump such as shown in the line 95, substantially all of the solvent is extracted from the spent, leached ore with the result that loss of solvent is minimized.

The second digester tube 62 is inclined at about the same angle as tube 61, and it is provided with a beach area 96 at its upper end which enables the solvent to drain out of the ore. A second vacuum area 97 is provided in the upper end of the digester tube 62. A second air vent 97a is provided having the same function and structure as the vent 77.

Before being discharged from the digestion system, the ore is subjected to heat above the dry point of the distillation range of the solvent in a distillation zone 98 which distills any residual solvent in the ore so as to economize in the use of solvent. The solvent vapor produced in the distillation zone 98 is drawn off through vacuum duct 95 along with liquid passing through filter 97. After passing through the distillation zone, the spent ore may be discharged from the system through a dump valve 99, said dump valve being counterweighted to normally closed position in order to prevent excessive admission of air.

It will be understood that, whereas two digester tubes 61 and 62 have been illustrated and described, as conditions warrant, additional digester tubes may be employed. The almost complete drying of the ore after passing through each digester tube results in great economy in the operation of the process. Alternatively, a single digester tube may be employed, together with a centriguge to free the extracted ore of solvent.

The counterflow principle employed and the fact that the fresh solvent is brought into contact with ore from which most of the sulphur has already been dissoved, also promote the efficiency of the process. It will also be understood that the solvent and solvent vapors drawn off at the vacuum areas 76 and 97 and the distillation zone 98 are condensed and reused.

After discharge from settler 86, the solution is filtered to remove any solids which may remain suspended in the solution. Standard commercial filters 101 may be employed in this step.

After having been filtered in filters 101, pregnant solution is sprayed into or run through precipitator 106. Said precipitator 106 is preferably a cylindrical, rotating drum 107 which is inclined so that the solution settles toward one end, the exterior of said drum being subjected to a cooling action by causing cold water to be flowed over the same through nozzles 108, the water being recovered and reused as required. The water may be refrigerated to augment the action thereof. The reduction in temperature of the solution by reason of rapid heat transfer through the thin metal drum 107 causes crystallization of the sulphur. In order to prevent the crystals from caking on the interior surfaces of the drum and thereby interfering with heat transfer, a plurality of longitudinally extending rods 111 are disposed loosely within the drum and the drum is caused to revolve. The action of rods 111 results in dislodging and breaking up the incipient crystal growths from the surface of drum 107. Rods 111 are retained in the drum by an annular screen 112 in the lower end of the drum. It will be understood that, by regulating the rate of flow and temperature of the cooling water, and the speed of rotation of the drum 107, the size of the crystals of sulphur may be regulated. Screen 112 may also be utilized to regulate the size of crystals passing therethrough.

For the purpose of recovering solvent vapor from the precipitator 106, a pipe 113 is provided which is connected to the precipitator and leads to a vacuum tank 121 common to other portions of the system serving the purpose of collecting such vapors throughout the system.

It may be desirable to have a heated, closed tank 102 immediately preceding the precipitator through which a portion or all of the sulphur solution may be passed. The purpose of tank 102 is to provide the opportuntiy to raise temporarily the temperature of the solution by a few degrees as a precaution against premature precipitation of sulphur. Tank 102 may also act as a final settler for any foreign solid particles which may have been carried along in the flow of solution and whose presence would be deleterious to the final sulphur product.

After passing through precipitator 106, the resulting cooled slurry of used solvent or mother liquor and crystals of sulphur are filtered in any suitable commercial filter 116, and the crystals may be washed and rewashed by a wash liquid. Washing liquids which are advantageous are low boiling point solvents or hydrocarbons such as hexane, or a chlorohydrocarbon, such as methylene chloride or trichlorethylene. Such low boiling washing liquids are readily removed from the washed crystals by vaporization. This final filtering operation may be carried out intermittently, and recovered, used solvent may be withdrawn through a pipe 117 to be returned to the system via the solvent preheater 92. Such recovered, recycled solvent may, of course, be subjected to redistillation, or to filtering on a decolorizing filter, as explained hereinabove in connection with Fig. 1.

The solvent recovered from other parts of the system is also recycled. Thus, liquid solvent and solvent vapors drawn off through ducts 75 and 95 and solvent vapor drawn off through pipe 113, are collected in tank 121 and are transferred through a pipe 122 to a conventional condenser 123. Traces of color which may contaminate the solvent may be removed by periodic distillation by bypassing through still 124 in order to prevent discoloration of the recovered sulphur. The solvent passes either directly from condenser 123 or from still 124 through pipe 126 to tank 92. Alternatively, a single solvent recovery and purifying system for liquid solvent and solvent vapor may be employed, as illustrated in Fig. 1.

As has been mentioned above, with particular reference to the beach area and the point of introduction of solvent into the lower digester tube 61, it is important not only to achieve intimate contact between solvent and ore, but after such contact has been made it is also advantageous to drain the solvent from the ore as completely as possible. The two beach areas in the lower and upper tubes 61 and 62 promote such drainage.

In Figs. 4, 5 and 6 certain modifications of the apparatus and procedure of the present invention are illustrated which effect such drainage more efficiently, and by a continuous technique. Referring now to Figs. 4 and 5, a lower digester tube 150 is shown which may be generally similar to the digester tube 61 of Fig. 2, the jacketing being omitted for simplicity. A screw conveyor 151 having a drive shaft 152 and including flights 153 is illustrated which is generally similar to the conveyor 64 of Fig. 4. However, a suitable number of scraper rods 154 are provided, e.g., two such rods, which are fixed to the periphery of the conveyor 151, extend longitudinally thereof and are spaced apart. Preferably, these rods are of square or rectangular cross section, as shown in Fig. 5, and where two such rods are employed, they are 180° apart. These rods just clear the inner, lower surface of the tube 150. As the screw conveyor 151 rotates to advance the solids longitudinally upward through the tube, the rods 154 serve, each time they pass through their lower culmination, to sweep the solids to one side and away from the bottom of the trough of the tube. They also cause the stream of solids to tend to stand on one edge along the wall of the tube. The advantage thus obtained is a clear path for the longitudinally, downflowing solvent along the bottom of the tube. Also, the angle of the tube is relatively flat, e.g., about 10° from the horizontal, but the solid stream when swept up the side of the tube stands at a steep angle to the horizontal with the result that much better drainage is obtained. When the rod sweeps toward its upper culmination, the solids fall back to the trough of the tube and the resulting turbulence given the flow of solids is of advantage in drainage of liquid from the solids.

Referring now to Fig. 6, wherein parts identical to parts in Figs. 4 and 5 are identically numbered, instead of providing scraper bars I employ scraper hooks 160. Each hook 160 is pivoted at 161 on a flight of the conveyor and is free to swing, and the outer end of each such hook is offset at 162 to provide, in effect, a scoop which drags along the surface of the tube 150, or barely clears the same, when in the position shown in Fig. 6. As each hook is rotated to the position of the righthand hook in Fig. 6, it will scrape the advancing ore stream aside, leaving the bottom of the tube momentarily clear. This facilitates the downward flow of liquid and at the same time it drags the solids to some extent up the sides of the tube, thus providing a much steeper and better angle for drainage of liquid from the solids than the relatively flat angle of the tube itself. These are advantages which are generally similar to those provided by the scraper rods 154 shown in Figs. 4 and 5. The length "*l*" of each hook 160 should, of course, be less than the distance "*r*" from the axis of pivot 161 to the pheriphery of the drive shaft 152; otherwise, the hooks 160 may become hung up on the drive shaft 152.

Yet another modification of the apparatus and procedure of the invention are illustrated in Figs. 7 and 8. Referring to these figures, a digester tube 170 is shown which is intended to serve the same purpose as the lower digester tube 61 of Fig. 1, but which incorporates certain advantageous variants. The tube 170 is provided with a steam jacket 171 which, as is best shown in Fig. 8, encloses the sides and bottom but not the top of the tube. A screw conveyor 172 and an ore inlet chute 173 are also provided. At 174 there is provided a solvent inlet to which is connected a pipe 175 for conducting fresh solvent, or partially enriched solvent from an upper digester tube (not shown) at approximately the junction of the solvent (shown at 155 and the beach area (shown at 176). A filter (not shown) may be provided for the beach area as in Figs. 2 and 3.

The lower end 177 of the tube 170 is widened and deepened. As will be seen in Fig. 8, the lower end 177 fans out, and as will be seen in Fig. 7, the top of the tube is horizontal. Adjacent the lower extremity of the lower end 177, a baffle 178 is provided which may be a solid baffle, or a perforated baffle in which the openings are sufficiently small to screen out even fine particles of suspended solids. The baffle 178 extends down somewhat more than half the depth of the lower end 177. A screen 179 is also provided which extends from the baffle 178 to the extreme lower end of the tube and from one side to the other. This screen has openings of sufficiently small size to screen out the finest suspended particles. Above the screen and below the normal liquid level in the tube 170, there is provided an outlet tube 180 for outflow of enriched solvent.

In the modification illustrated in Figs. 7 and 8, the enlarged lower end portion 172 of the tube 170 provides a large reservoir of solvent whose velocity is greatly reduced. Hence, suspended solid particles have a greater opportunity to settle to the screw conveyor which will then move them upwardly in countercurrent contact with downwardly flowing solvent. The baffle 178 and the screen 179 assist in this segregation of suspended solids and enriched solvent.

It will be apparent from the above detailed description with reference to Figs. 1–8, that a complete process is provided for pretreatment of a sulphur-bearing ore or other sulphur-bearing solid, continuous solvent extraction of the ore, recovery and recycling of used solvent, and separation of the extracted sulphur. It is desired at this point to note certain factors and techniques in addition to or in amplification of those described hereinabove, which contribute to commercial success of the process.

In carrying out the process of this invention, wherein a sulphur ore or other solid containing elemental sulphur is subjected to continuous, countercurrent contact with a solvent, it will be apparent that a material handling problem exists in that a solid phase is moved continuously and oppositely to a moving liquid phase. Extracted solid phase is removed at one point and enriched liquid phase is removed at another point. From a purely mechanical standpoint it is essential that a minimum ratio of liquid phase to solid phase be maintained; otherwise, separation of liquid phase from solid phase is inefficient or impossible. Above and beyond what may be called the "mechanical minimum" of liquid phase/solid phase ratio, it is also important that a substantial excess of liquid phase be maintained. Thus, if only a slight excess of liquid phase is employed beyond that required to wet the solid phase, the process will be operative but a high proportion of the total liquid can be carried over with the effluent solid phase. This liquid is solvent enriched in sulphur, and because the total liquid quantity is relatively small, the sulphur concentration herein is relatively high. Thus a proportionately large quantity of sulphur is carried over with the effluent solid phase. This solvent carried over can be recovered at considerable expense by vaporizing the solvent from the solid effluent but of course the sulphur which it contained remains with the extracted solids and may thus be lost.

Preferably with a solvent such as Socal No. 3, the solvent (liquid phase) to solids (solid phase) weight ratio is not less than about 4:1 and not greater than about 8:1.

In connection with solvent recovery, it will be apparent that, with apparatus such as that illustrated in Figs. 2 and 3, a large quantity of air will become mixed with the solvent vapor which is collected at 121. This presents a problem in that the partial pressure of the solvent vapor is greatly diminished. Accordingly, I prefer to provide a body of liquid solvent, to chill the same, and to conduct the recovered solvent vapor over or through such chilled liquid solvent. A more efficient and a more economical solvent recovery is thereby effected.

In both Figs. 1 and 2, it is indicated that recovered solvent is subjected to continuous distillation to purify it. However, in certain instances, it may be advantageous to subject the solvent to batch distillation.

In both Figs. 1 and 2, it is indicated that sulphur is recovered from solvent (or mother liquor) by chilling the liquid effluent from the digester, filtering the resulting slurry, and washing the filter cake. I have discovered an alternative method of recovery which is illustrated in Fig. 9 and which has certain advantages.

Referring to Fig. 9, the apparatus there illustrated is designated generally as 190 and it comprises an outer cylindrical vessel 191 and an inner cylindrical vessel 192 which are of relatively small diameters compared to their heights. The vessels 191 and 192 are spaced apart to provide a heating jacket 192a having an inlet 193a and an outlet 193b for passage of a heating fluid such as steam through the jacket to heat the contents of the inner vessel.

Alternatively, heating coils (not shown) disposed within the inner vessel 192, or any other suitable heating means may be employed. Conduits 199, 200 and 201 connect with the interior of the inner vessel 192 for a purpose which is explained hereinafter.

I have discovered that crystallized sulphur can be recovered efficiently, and with certain advantages over filtration and centrifugation methods, by heating the slurry of mother liquor and sulphur crystals to or somewhat above the melting point of the sulphur so as to melt the sulphur, then stratifying the two liquid phases. The sulphur will ordinarily be the heavier phase, e.g., heavier than the hydrocarbon solvents mentioned above. Of course, by so doing the sulphur and solvent are brought to a condition of high mutual solubility, which would seem to defeat the object of separation. However, I have found that efficient separation can be achieved if carried out sufficiently quickly and/or if conditions are such as to minimize the area of the interface between the two liquid phases.

In the preferred embodiment of this aspect of my process of sulphur recovery, a slurry of chilled solvent (which, of course, contains some dissolved sulphur) and sulphur crystals, such as recovered from the precipitator 106, in Fig. 2, is passed through the inlet conduit 199 into the inner vessel 192 and is allowed to settle. Steam or other heating fluid is passed through the jacket 192a to melt the sulphur. In this connection, it may be noted that the jacket 192a may encompass only the lower portion of the apparatus, or heating coils may be disposed only in the lower section of the inner vessel, to apply heat directly only to the lower portion of the vessel.

Heat sufficient to melt the sulphur is thus supplied, with the result that two liquid strata are produced, namely, an upper stratum 202 of solvent or mother liquor (assuming it is of lesser density than molten sulphur) and a lower layer stratum 203 of molten sulphur. The inner vessel 192 has a small diameter compared to its height. Hence the area of the interface between the two liquid phases is small and, as a result, the redissolution of molten sulphur in the solvent is minimized.

Molten sulphur is tapped at 201 and solvent at 200, thereby effecting a clean separation without the necessity of filtration or centrifugation.

This procedure may be carried out batchwise or continuously, and it may be applied to the entire body of chilled solvent and sulphur (i.e., to the entire slurry from the precipitator), or it may be applied to the wet crystals resulting from simple atmospheric filtration of the chilled slurry. It is especially practical by reason of the fact that the density of molten sulphur differs greatly from the preferred solvents of my invention and settles rapidly without any great tendency to redissolve.

By way of further explanation and elucidation, it is desired to point out certain unique advantages and applications of the solvent extraction process of the present invention, as follows:

As stated hereinabove, the method of my invention is applicable to an ore which has been pre-concentrated by flotation. More broadly stated, the method of my invention is applicable both as an adjunct to and as a substitute for flotation methods. Flotation methods have certain disadvantages. Thus, an ore should be crushed to a rather high degree of fineness, e.g., to 48 mesh, for efficient recovery by flotation; coarser particles are not as readily susceptible to flotation. Also flotation does not provide a satisfactorily high yield of sulphur from the solid being treated and the sulphur produced by flotation does not have a satisfactory purity for many purposes. If the solvent extraction method of the present invention is employed in lieu of flotation, the ore need not be crushed so fine; generally crushing to ¼ inch particles is sufficient. In this connection it should be noted that sulphur ores are generally porous rock having sulphur deposited in the pores. The solvent employed in accordance with the invention will extract sulphur efficiently from the pores of ¼ inch particles.

In making a choice of methods, i.e., in choosing whether to employ the solvent extraction method of the present invention as a substitute for or as an adjunct to a flotation treatment, certain guiding factors are as follows:

Assuming an ore containing about 20% or less of sulphur by weight based on weight of ore, it is preferable to concentrate the ore first by flotation, e.g., to 50 to 60% sulphur. The pre-concentrated ore will then be further treated by solvent extraction in accordance with the present invention to produce a commercial grade of sulphur.

Assuming an ore containing, say, 50% by weight of sulphur based on weight of ore, it is preferable to dispense with flotation altogether and to subject the ore to solvent extraction.

Assuming the existence of a plant for flotation treatment of sulphur ore, such plant may be operated in the usual manner to produce a concentrate containing, say, 80% of sulphur, which is then heated to melt the sulphur. The molten sulphur is removed by known techniques, e.g., by filtration through a fine screen permitting passage of molten sulphur and serving to retain the solid residue. This solid residue may contain as much as 50% of sulphur. As explained hereinabove, this residue is not susceptible to refinement by flotation, but it can be treated by solvent extraction to produce almost a 100% yield of sulphur which is commercially pure. Such a residue, by reason of its method of production, requires no preliminary drying step.

Alternatively, a modified flotation-solvent extraction method may be employed wherein a lean ore is pre-concentrated by flotation to about 50 to 60% sulphur, then subjected to solvent extraction to produce commercially pure sulphur.

By this means a degree of flexibility is provided which has not been available heretofore. Thus, a sulphur refiner can modify his procedure from time to time in the light of the cost and quality of ore, the price of sulphur and the relative costs of flotation and solvent extraction techniques.

Yet another combined flotation-solvent extraction process may be carried out as follows: An ore containing sulphur is crushed finely, for example, to 4 to 20 mesh, depending upon the nature of the ore. The crushed material is then screened through fine screens and the fines resulting from this screening are then subjected to flotation. The sulphur-enriched flotation product and the coarse material which did not pass the screens, are then subjected to the solvent extraction process of the invention.

Although the foregoing invention has been described in some detail by way of illustration and example for purposes of clarity of understanding, it is understood that certain changes and modifications may be practiced within the spirit of the invention and scope of the appended claims.

I claim:

1. A method of refining sulphur which comprises providing a sulphur concentrate containing not less than about 50% of elemental sulphur together with impurities which are substantially completely insoluble in hydrocarbon solvents, said concentrate being in the form of particles not exceeding about ¼ inch, providing also a sulphur solvent in the form of a petroleum hydrocarbon mixture having a mixed aniline point less than about 50° F. and boiling substantially completely within the range of 250° F. to 450° F., heating said solvent to about 230° F., heating said concentrate to expel free moisture therefrom and to raise the temperature thereof to about 230° F., passing the heated solvent and dry, heated concentrate countercurrently through an extraction apparatus, meanwhile maintaining the temperature of the solvent and of the concentrate at not less than about 230° F., maintaining such countercurrent contact under conditions of agitation sufficient to intimately contact the solvent with the concentrate, separating concentrate from the solvent at at least one point between the point of introduction of the concentrate into and its point of removal from said extraction apparatus, and draining the separated concentrate, applying suction to the thus separated concentrate to remove adhering solvent therefrom, separating enriched solvent at one end of the extraction apparatus and extracted solids from the other end thereof, draining and applying suction to the thus separated, extracted solids, chilling the enriched solvent to produce a slurry of sulphur and solvent, filtering such slurry to separate solid sulphur from liquid solvent, condensing solvent vapors recovered in the process, and recycling the filtered solvent and condensed vapors to the extraction apparatus after heating the same.

2. A method of extracting sulphur from ore comprising, crushing sulphur-bearing ore, warming the ore, warming a low aniline point, aromatic hydrocarbon solvent to a temperature below its boiling point, digesting said ore in said warm solvent in at least two stages, wherein the first stage includes counter-flowing ore and pregnant solvent from the second stage and intimately mixing the same, settling particles of ore from the pregnant solvent after thorough mixing with the ore, elevating the ore from contact with solvent, drying the ore by application of heat, and then further drying the ore by filtering and vacuum, and wherein the second stage included counterflowing ore from said first stage with barren solvent and intimately mixing the same, elevating the ore from contact with solvent, drying the ore by application of heat, and then heating the ore above the end point of said solvent to vaporize remaining solvent, drawing off liquid and vapor solvent from the ore after thorough mixing with the solvent by subjecting the same to suction, filtering the settled pregnant solvent, precipitating sulphur from said filtered solvent by subjecting the same to reduced temperature, said precipitating step being controlled both as to temperature and rate of cooling to control size of crystals precipitated, breaking crystal growth during the precipitating step by mechanical action, and then filtering crystals of sulphur from said solvent.

3. A method according to claim 2 in which said solvent after filtering is re-used and periodically distilled to remove color trace.

4. A method according to claim 2 in which a low vacuum is maintained throughout said digesting and precipitating steps by creating suction to remove solvent vapors and said vapors are condensed and re-used.

5. A method according to claim 2 in which each said digesting step is accomplished in an enclosed area being disposed at an angle of inclination to the horizontal whereby solvent flows downwardly toward the lower end of said area and solid is conveyed upwardly, said solvent being introduced before the drying of said ore to flow downwardly by gravity while being mixed with said ore.

6. A process for digesting sulphur from ground ore comprising digesting said ore with an aromatic, low aniline hydrocarbon solvent having a distillation range between the approximate limits of 357–406° F. at a temperature below the distillation range of said solvent, drying the partially spent ore to remove most of the solvent, digesting said partially spent ore with fresh solvent at a temperature below the distillation range of said solvent, drying spent ore to remove most of the solvent, and then heating said spent ore above the distillation range of said solvent to vaporize substantially all of the remaining solvent, said drying steps including first draining the solvent from the ore and then drawing the solvent by strong suction through a filter while restricting the ingress of air during the drying step.

References Cited in the file of this patent

UNITED STATES PATENTS

| | | |
|---|---|---|
| 166,279 | Johnson | Aug. 3, 1875 |
| 623,892 | Fairley | Apr. 25, 1899 |
| 1,283,099 | Darling | Oct. 29, 1918 |
| 1,963,921 | Nagelvoort | June 19, 1934 |
| 2,195,870 | Rosen | Apr. 2, 1940 |
| 2,227,605 | Swallen et al. | Jan. 7, 1941 |
| 2,234,269 | McDonald | Mar. 11, 1941 |
| 2,253,566 | Klepetko | Aug. 26, 1941 |
| 2,409,408 | Tweeddale | Oct. 15, 1946 |
| 2,785,059 | McDonald | Mar. 12, 1957 |

FOREIGN PATENTS

| | | |
|---|---|---|
| 366,052 | Great Britain | July 25, 1930 |